United States Patent
Jones (10) Patent No.: US 8,555,762 B1
(45) Date of Patent: Oct. 15, 2013

(54) SAW STOP

(76) Inventor: John Christopher Jones, Floyd Knobs, IN (US)

( * ) Notice: Subject to any disclaimer, the term of this patent is extended or adjusted under 35 U.S.C. 154(b) by 396 days.

(21) Appl. No.: 12/769,715

(22) Filed: Apr. 29, 2010

Related U.S. Application Data (60) Provisional application No. 61/173,861, filed on Apr. 29, 2009.

(51) Int. Cl.
  *B26D 1/157* (2006.01)
  *B27C 9/02* (2006.01)

(52) U.S. Cl.
  USPC ............... 83/522.16; 83/471.3; 83/477.2

(58) Field of Classification Search
  USPC ............ 83/522.16, 468, 467, 212, 268, 391, 83/471.3, 471.2, 468.2, 468.4, 477.2; 269/303, 315, 319, 304; 144/371, 144/135.2, 253.2, 253.5, 253.6
  See application file for complete search history.

(56) References Cited

U.S. PATENT DOCUMENTS

| | | | |
|---|---|---|---|
| 195,722 A | 10/1877 | Morris | |
| 869,309 A | 10/1907 | Kramer | |
| 957,779 A | 5/1910 | Leaver, Jr. | |
| 1,867,922 A * | 7/1932 | Nelson | 269/315 |
| 2,485,274 A | 7/1945 | Garrett | |
| 2,607,124 A * | 8/1952 | Dery | 33/567.1 |
| 3,249,135 A * | 5/1966 | Leaver | 269/315 |
| 3,945,288 A | 3/1976 | Olmr | |
| 3,946,631 A | 3/1976 | Malm | |
| 3,969,967 A | 7/1976 | Isley | |
| 4,018,118 A | 4/1977 | Goff | |
| 4,037,502 A | 7/1977 | Westfall | |
| 4,041,824 A | 8/1977 | Wynn | |
| 4,077,290 A * | 3/1978 | Hreha | 83/471.2 |
| 4,098,310 A | 7/1978 | Sanford et al. | |
| 4,099,434 A | 7/1978 | Hardouin | |
| 4,111,088 A | 9/1978 | Ziegelmeyer | |
| 4,133,237 A | 1/1979 | Lewin | |
| 4,170,158 A | 10/1979 | Weaver | |
| 4,170,912 A | 10/1979 | Bliss | |
| 4,197,776 A | 4/1980 | Wynn | |
| 4,205,568 A | 6/1980 | Foster | |
| 4,226,152 A | 10/1980 | Bies | |
| 4,241,634 A | 12/1980 | Ambler | |
| 4,244,202 A | 1/1981 | Anderson et al. | |
| 4,277,998 A | 7/1981 | Mayo | |
| 4,299,152 A | 11/1981 | Ambler | |
| 4,300,671 A | 11/1981 | Bliss | |
| 4,316,400 A | 2/1982 | Mayo | |
| 4,328,931 A | 5/1982 | Gordon-clark et al. | |

(Continued)

OTHER PUBLICATIONS

Scotchman; Scotchman Advanced Measuring Systems; web site: http://www.scotchman.com/ams.php; accessed Jul. 28, 2010; US.

(Continued)

*Primary Examiner* — Ghassem Alie
(74) *Attorney, Agent, or Firm* — Middleton Reutlinger; Robert H. Eichenberger; Chad D. Bruggeman (57) ABSTRACT

A saw stop assembly is provided with a fence and a stop assembly. The fence may be provided with a first array of teeth. The stop assembly may also be provided with a second array of teeth. The first and second arrays of teeth are designed such to meshingly engage with one another. A clip may be provided to affix the stop to the fence.

16 Claims, 11 Drawing Sheets

(56) References Cited

U.S. PATENT DOCUMENTS

| | | | |
|---|---|---|---|
| 4,331,052 | A | 5/1982 | Neff |
| 4,349,945 | A | 9/1982 | Fox |
| 4,412,468 | A * | 11/1983 | Bucy ............................ 83/468 |
| 4,419,914 | A | 12/1983 | Evans |
| 4,432,449 | A | 2/1984 | Neff |
| 4,454,793 | A | 6/1984 | Strong |
| 4,476,757 | A | 10/1984 | Morris |
| 4,519,429 | A | 5/1985 | Dreese |
| 4,581,968 | A | 4/1986 | Gibson et al. |
| 4,584,918 | A | 4/1986 | Stubbe et al. |
| 4,658,689 | A | 4/1987 | Yakich |
| 4,660,449 | A | 4/1987 | LeTarte |
| 4,693,158 | A | 9/1987 | Price |
| 4,718,146 | A | 1/1988 | Adkison |
| 4,722,258 | A | 2/1988 | Johnson |
| 4,741,387 | A | 5/1988 | Strong |
| 4,745,834 | A | 5/1988 | Neumann |
| 4,751,865 | A | 6/1988 | Buckalew |
| 4,769,909 | A | 9/1988 | Ducret |
| 4,785,550 | A | 11/1988 | Wilkins |
| 4,798,113 | A | 1/1989 | Viazanko |
| 4,869,304 | A | 9/1989 | Gore |
| 4,890,801 | A | 1/1990 | Brouwer et al. |
| 4,899,795 | A | 2/1990 | Hackett |
| 4,901,612 | A | 2/1990 | Harris |
| 4,911,048 | A | 3/1990 | Osborne |
| 4,942,795 | A | 7/1990 | Linke et al. |
| 4,957,024 | A | 9/1990 | Albrecht |
| 4,961,269 | A | 10/1990 | Luttmer et al. |
| 4,972,749 | A * | 11/1990 | Grove ........................... 83/468.2 |
| 4,974,306 | A | 12/1990 | Cole et al. |
| 4,987,813 | A | 1/1991 | Viazanko |
| 4,995,288 | A | 2/1991 | DellaPolla |
| 5,016,508 | A | 5/1991 | Hallenbeck |
| 5,018,562 | A * | 5/1991 | Adams ........................ 144/253.1 |
| 5,024,257 | A | 6/1991 | Lloyd |
| 5,038,486 | A | 8/1991 | Ducate, Sr. |
| 5,040,443 | A | 8/1991 | Price |
| 5,042,346 | A | 8/1991 | McCann |
| 5,080,152 | A | 1/1992 | Collins et al. |
| 5,092,058 | A | 3/1992 | Luttmer et al. |
| 5,105,862 | A | 4/1992 | Skinner et al. |
| 5,107,736 | A | 4/1992 | Albrecht |
| 5,121,554 | A | 6/1992 | Havins |
| 5,140,778 | A | 8/1992 | Carruth |
| 5,160,340 | A | 11/1992 | Gary et al. |
| 5,207,007 | A | 5/1993 | Cucinotta et al. |
| 5,226,345 | A | 7/1993 | Gamble |
| 5,231,905 | A | 8/1993 | Trahan |
| 5,245,903 | A | 9/1993 | Armentrout |
| 5,253,558 | A | 10/1993 | Guddal, Jr. |
| 5,327,653 | A | 7/1994 | Pistorius et al. |
| 5,337,641 | A | 8/1994 | Duginske |
| 5,365,812 | A | 11/1994 | Harnden |
| 5,443,554 | A | 8/1995 | Robert |
| 5,444,635 | A | 8/1995 | Blaine et al. |
| 5,537,903 | A | 7/1996 | Brewer |
| 5,542,325 | A | 8/1996 | Bane, III |
| 5,617,909 | A | 4/1997 | Dunginske |
| 5,676,187 | A | 10/1997 | Owens et al. |
| 5,690,391 | A | 11/1997 | Kingsley et al. |
| 5,694,821 | A | 12/1997 | Smith |
| 5,699,705 | A | 12/1997 | Sibbet |
| 5,735,054 | A | 4/1998 | Cole |
| 5,743,161 | A | 4/1998 | Boudreau |
| 5,768,966 | A | 6/1998 | Duginske |
| 5,771,767 | A | 6/1998 | Itami |
| 5,809,631 | A | 9/1998 | Poulin |
| 5,823,084 | A | 10/1998 | Ramey |
| 5,845,555 | A | 12/1998 | Dawley |
| 5,865,228 | A | 2/1999 | Patterson |
| 5,867,913 | A | 2/1999 | Pettigrew |
| 5,884,682 | A | 3/1999 | Kennedy et al. |
| 5,988,030 | A | 11/1999 | Hada et al. |
| 5,989,607 | A | 11/1999 | Dieso et al. |
| 6,021,826 | A | 2/2000 | Daniell |
| 6,039,097 | A | 3/2000 | Kennedy et al. |
| 6,039,098 | A | 3/2000 | Kennedy et al. |
| 6,041,837 | A | 3/2000 | Hanson |
| 6,050,167 | A | 4/2000 | Wilhite |
| 6,053,083 | A | 4/2000 | Mosey |
| 6,076,575 | A | 6/2000 | Harkness |
| 6,079,309 | A | 6/2000 | Molburg |
| 6,082,723 | A | 7/2000 | Matthews |
| 6,095,024 | A | 8/2000 | Brutscher et al. |
| 6,128,993 | A | 10/2000 | Zach |
| 6,170,372 | B1 | 1/2001 | Weaver |
| 6,195,905 | B1 | 3/2001 | Cole |
| 6,227,089 | B1 | 5/2001 | Hada et al. |
| 6,240,822 | B1 | 6/2001 | Musser |
| 6,244,145 | B1 | 6/2001 | Hada et al. |
| 6,263,773 | B1 | 7/2001 | McAdoo et al. |
| 6,305,449 | B1 * | 10/2001 | Stover ........................... 144/371 |
| 6,336,388 | B1 | 1/2002 | Marocco |
| 6,382,062 | B1 | 5/2002 | Smith |
| 6,401,585 | B1 | 6/2002 | Morgan |
| 6,477,929 | B1 | 11/2002 | Gibbs, Sr. |
| 6,487,949 | B1 | 12/2002 | Dharia |
| 6,499,224 | B1 | 12/2002 | Asick |
| 6,520,228 | B1 | 2/2003 | Kennedy et al. |
| 6,530,303 | B1 | 3/2003 | Parks et al. |
| 6,532,679 | B2 | 3/2003 | Cole |
| 6,557,601 | B1 | 5/2003 | Taylor |
| 6,575,067 | B2 | 6/2003 | Parks et al. |
| 6,644,157 | B2 | 11/2003 | Huang |
| 6,688,197 | B1 | 2/2004 | Niemela |
| 6,688,202 | B2 | 2/2004 | Parks et al. |
| 6,691,423 | B2 | 2/2004 | Fontaine |
| 6,698,159 | B2 | 3/2004 | Harris et al. |
| 6,752,059 | B1 | 6/2004 | Posont |
| 6,766,720 | B1 | 7/2004 | Jacobsen et al. |
| 6,766,721 | B2 | 7/2004 | Dharia |
| 6,880,442 | B2 | 4/2005 | Duginske |
| 6,907,807 | B2 | 6/2005 | Parks et al. |
| 7,017,459 | B2 | 3/2006 | Marocco |
| 7,017,632 | B2 | 3/2006 | Kennedy et al. |
| 7,063,000 | B2 | 6/2006 | Molburg |
| 7,077,179 | B1 | 7/2006 | Camiano et al. |
| 7,124,672 | B2 | 10/2006 | Marocco |
| 7,156,008 | B2 | 1/2007 | Talesky |

OTHER PUBLICATIONS

Scotchman; Accurate Measuring; web site: http://scotchman.com/ams-fabricator.php; accessed Jul. 28, 2010; US.

Scotchman; About Ams; web site: http://scotchman.com/ams.php?pg=about; accessed Jul. 28, 2010; US.

Scotchman; Multi-Loc; web site: http://scotchman.com/ams.php?pg=multiloc; accessed Jul. 28, 2010; US.

Scotchman; Quick-Loc; web site: http://scotchman.com/ams.php?pg=quickloc; accessed Jul. 28, 2010; US.

Scotchman; Machinery Applicatios; web site: http://scotchman.com/ams.php?pg=photos; accessed Jul. 28, 2010; US.

Scotchman; Instructions for Multi-Loc Stop Systems;web site: http://scotchman.com/pdf_docs/multi-loc.pdf; Printed Feb. 2007; US.

Scotchman; Instructions for Quick-Loc Stop Systems; web site: http://scotchman.com/pdf_docs/quick-loc.pdf; Printed Feb. 2007; US.

* cited by examiner

SAW STOP

CROSS-REFERENCE TO RELATED APPLICATIONS

This application claims priority, and benefit under 35 U.S.C. §119(e), to U.S. Provisional App. No. 61/173,861, filed on Apr. 29, 2009, the entire contents and disclosure of which is hereby incorporated by reference in its entirety.

TECHNICAL FIELD

This invention is used in conjunction with miter or chop saws.

BACKGROUND

When cutting wood or other material to length, it may be necessary to immobilize the piece to be cut.

SUMMARY

A saw stop assembly is provided with a fence and a stop assembly. The fence may be provided with a first array of teeth. The stop assembly may also be provided with a second array of teeth. The first and second arrays of teeth are designed such to meshingly engage with one another. The first and second arrays of teeth may take many forms, including, but not limited to, box, dovetail, triangular or waveform. A clip may or may not be provided to affix the stop to the fence.

BRIEF DESCRIPTION OF THE ILLUSTRATIONS

Embodiments of the invention are illustrated in the following illustrations.

FIG. 2 is a perspective view of a fence of the embodiment shown in

FIG. 1.

DETAILED DESCRIPTION

Miter saws and chop saws are frequently used to cut material to length. Such material may be, for example, wood or metal, such as steel or aluminum. In order to safely and accurately cut the material, such material must be immobilized in some fashion. Securing one end from lateral movement is often necessary in order to properly stabilize the material in order for it to be cut to length. Embodiments disclosed herein are directed to securely fixing a piece of material from lateral movement. Embodiments also allow a saw operator to make quick and accurate adjustments in order to cut multiple articles to varying lengths, and to allow multiple repeated cuts at the same lengths.

Figure 1A:
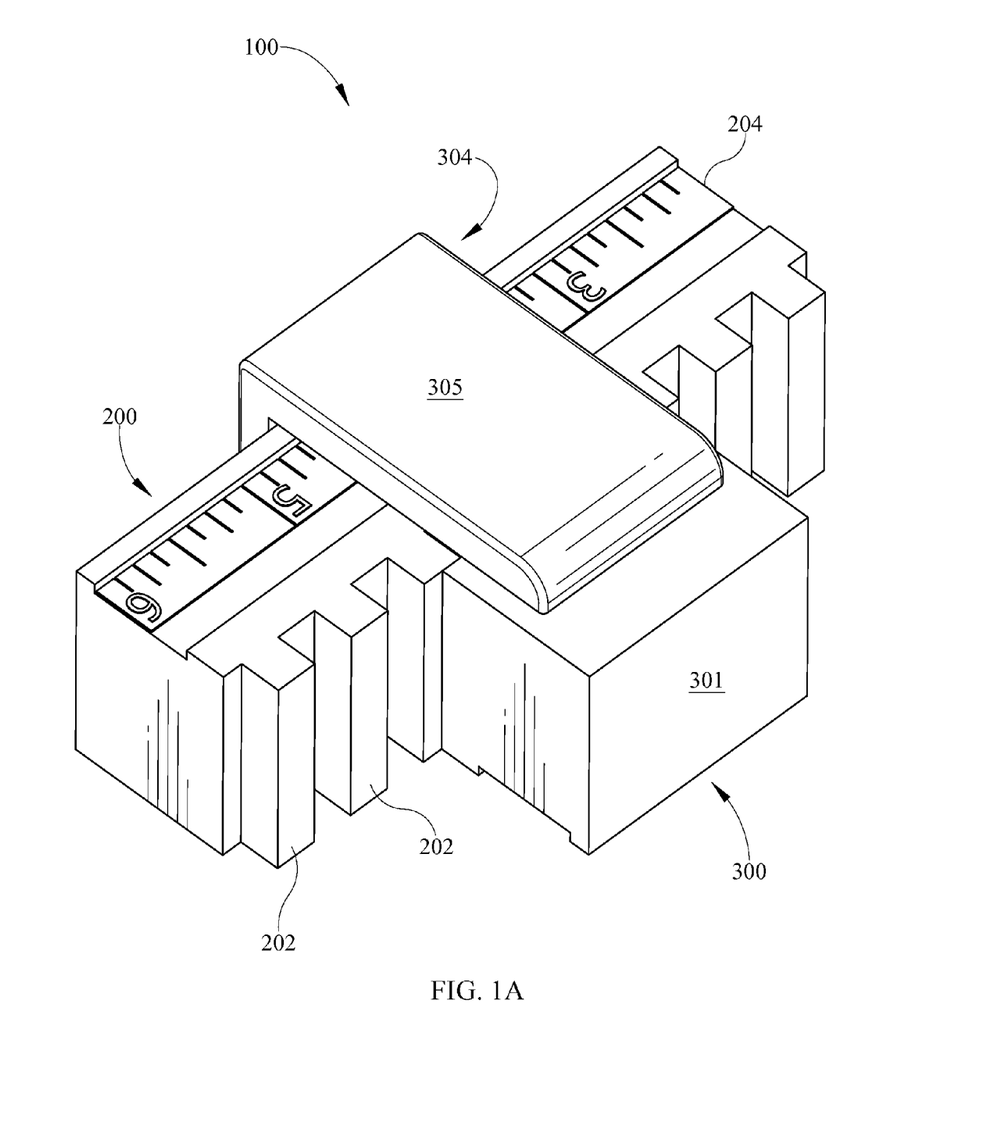
FIGS. 1A and 1B are perspective views of an embodiment of the present invention.
Figure 1B:
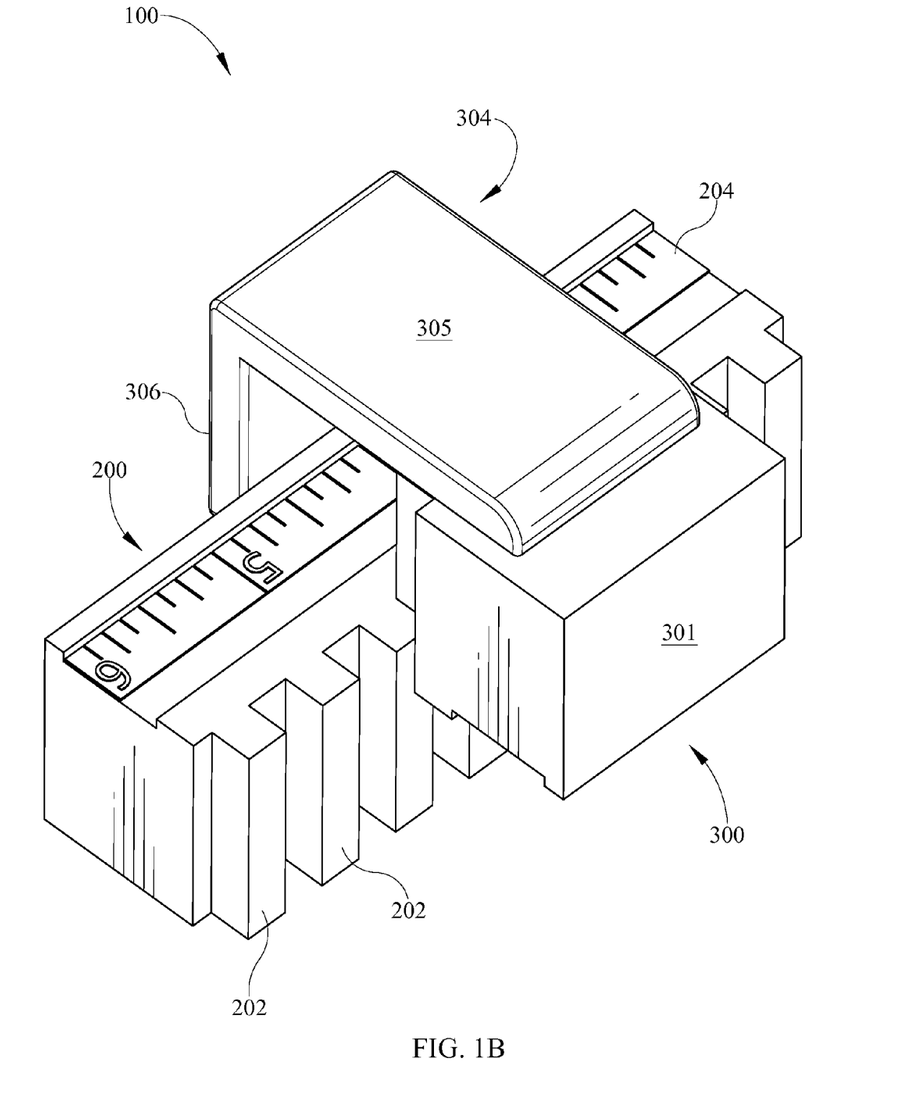

Referring now to FIGS. 1A and 1B, a saw stop assembly 100 is provided with a fence 200 and a stop assembly 300. The fence 200 secures a piece of material in at least one direction of lateral movement. FIG. 1B shows how the stop assembly 300 slides vertically over the top of the fence 200. The stop assembly 300 secures a piece of material 50 in at least one direction of lateral movement that is different from the direction in which the fence secures the same piece 50. The fence 200 may be provided with a rule 204 so as to allow a user to accurately measure the cut length of material 50. The fence 200 may be fixed relative to a saw assembly, either permanently or temporarily. Such means of affixing are well known in the art, examples may include, but are not limited to, welding, clamping, or fastening with mechanical fasteners. Such a saw assembly may have a horizontal support 400 to support the article 50. The horizontal support 400 may be provided with rollers 402 to assist in moving the article 50 in and out of place.

Figure 2:
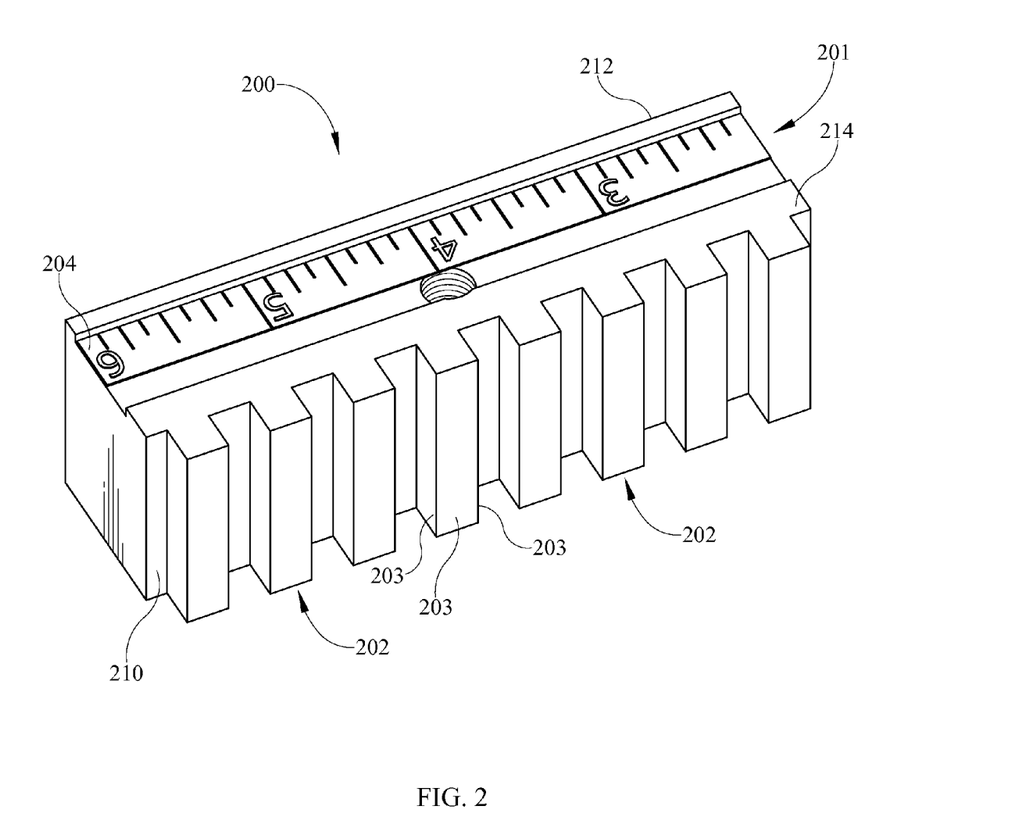
Figure 3:
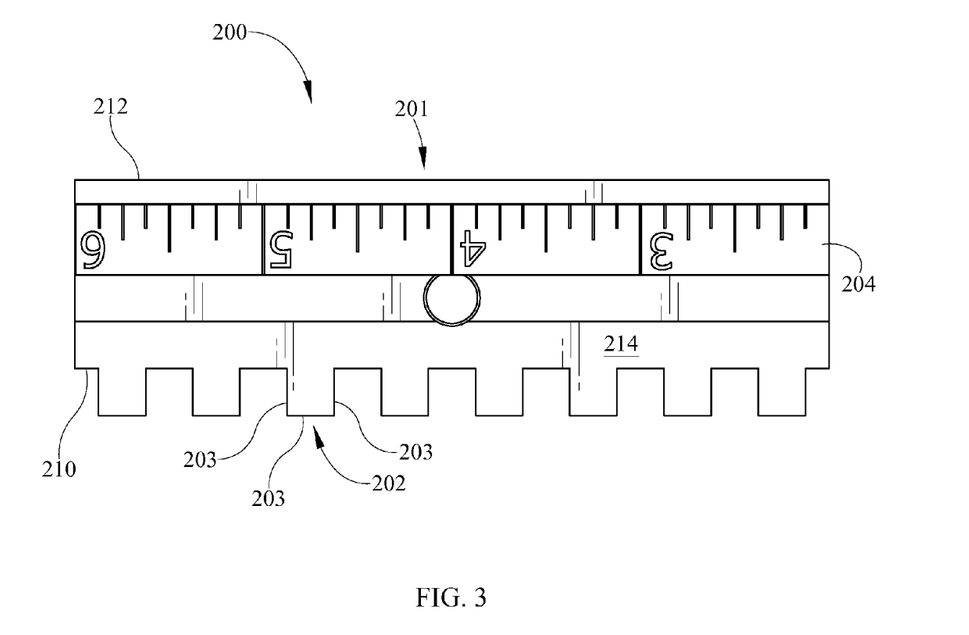
FIG. 3 is a top perspective view of the fence of FIG. 2.
Figure 10:
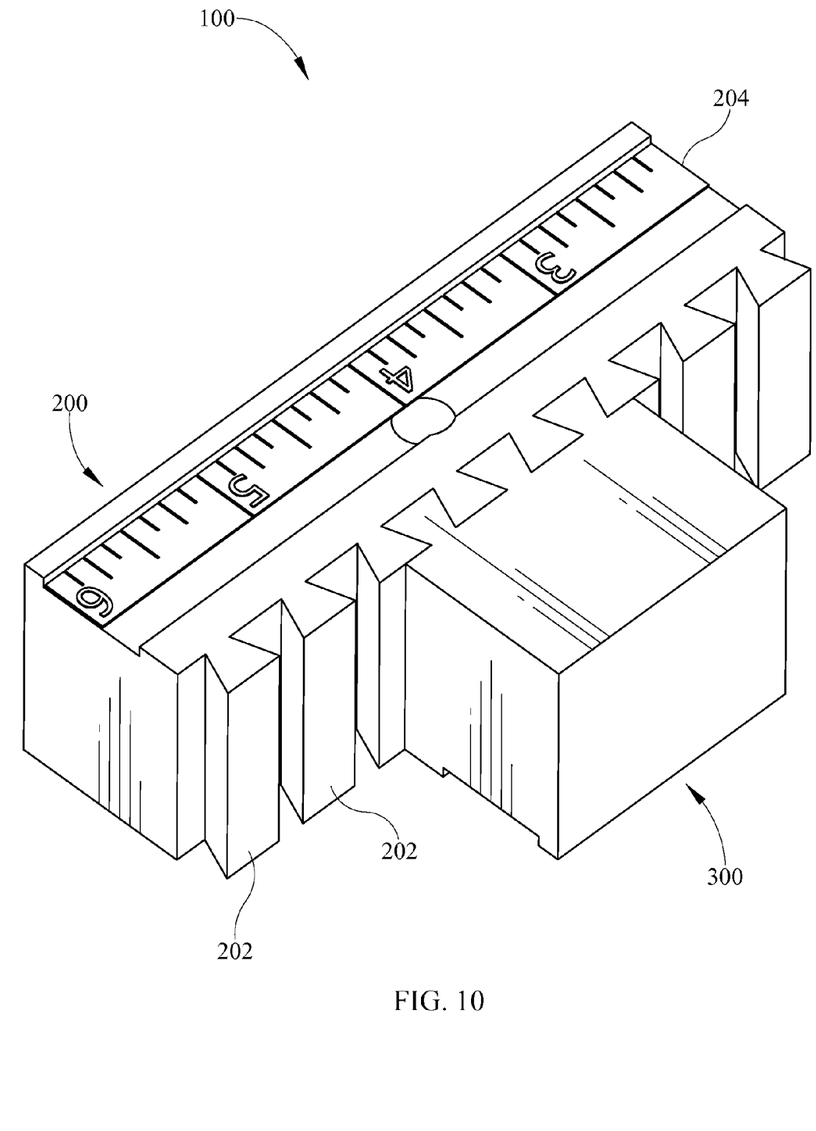
FIG. 10 illustrates a fence and stop assembly with dovetail teeth.

Referring now to FIGS. 2 and 3, the fence 200 is provided with a longitudinal body 201 having a front surface 210, a rear surface 212 and a top surface 214 extending therebetween. An array of fence teeth 202 may extend laterally from the front surface 210 and may have any number of vertical walls 203. The fence teeth 202 are generally shown in the Figures as being square and having three vertical walls 203, but may be provided in any number of shapes or sizes. The fence teeth 202 may be, for example, square, rectangular, triangular, trapezoidal, or sinusoidal in shape. The fence teeth 202 may also have, for example, square or rounded edges and corners. The possibilities are limitless, it being understood that basically any meshingly engaging or male/female structure is possible. For example as shown in FIG. 10, a fence and stop assembly is shown having dovetail type teeth, also with three vertical walls.

Figure 4:
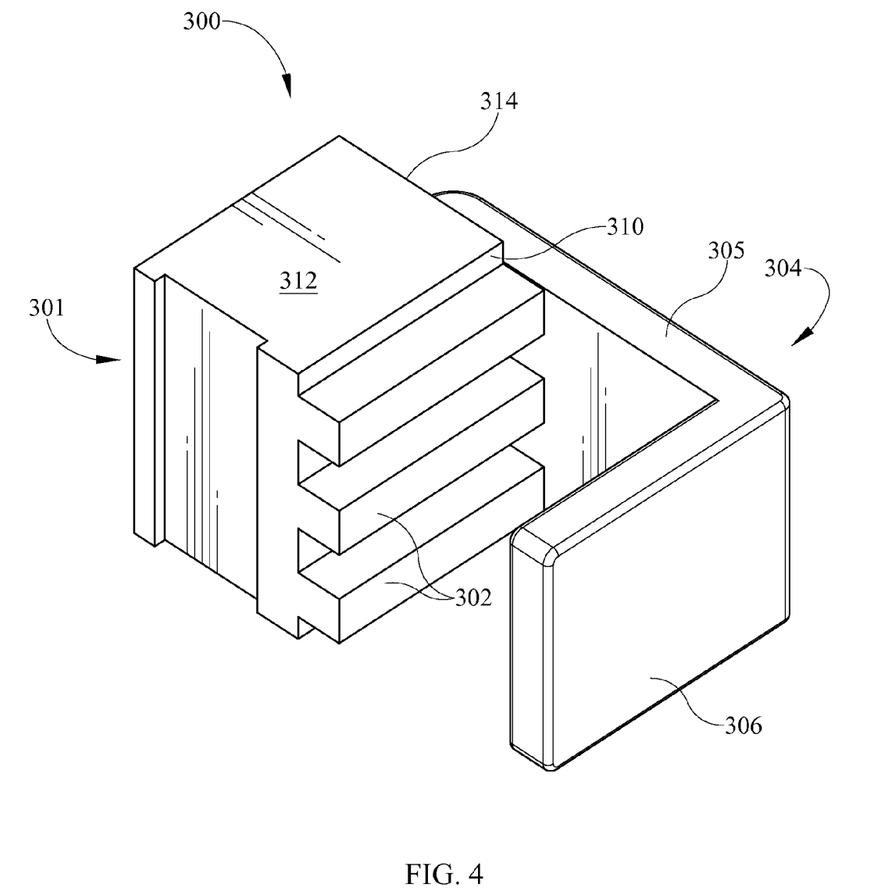
FIG. 4 is a perspective of a stop of the embodiment shown in FIGS. 1A and 1B.
Figure 5:
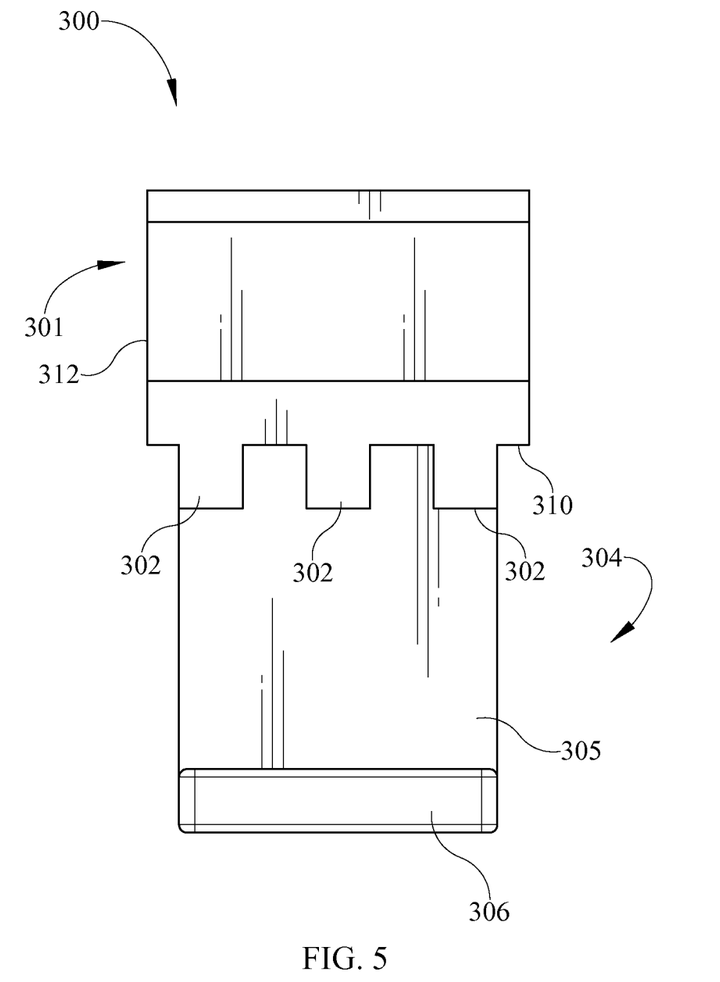
FIG. 5 is a front view of the stop shown in FIG. 4.
Figure 6:
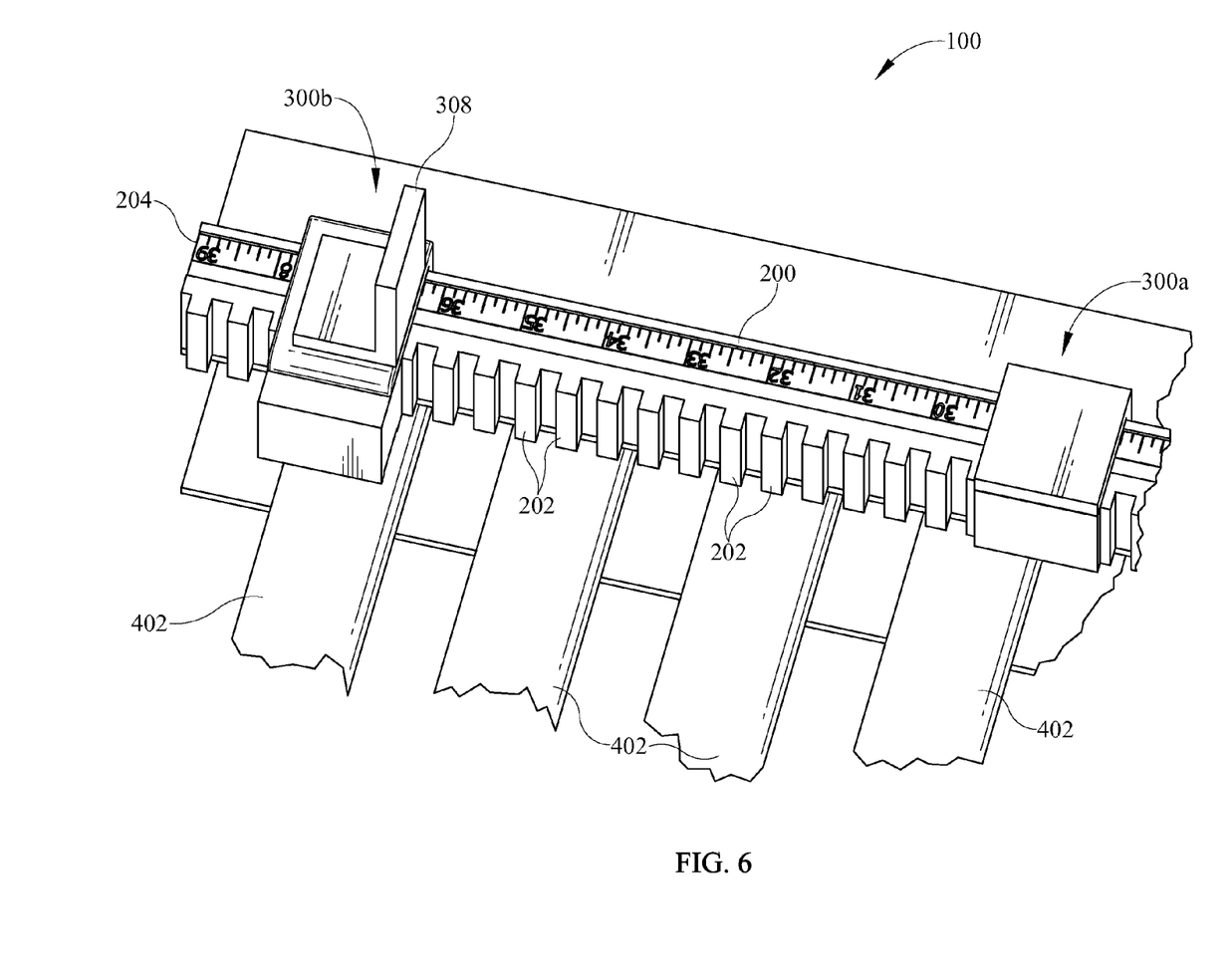
FIG. 6 is a top view of a saw stop assembly utilizing two stop assemblies.
Figure 7:
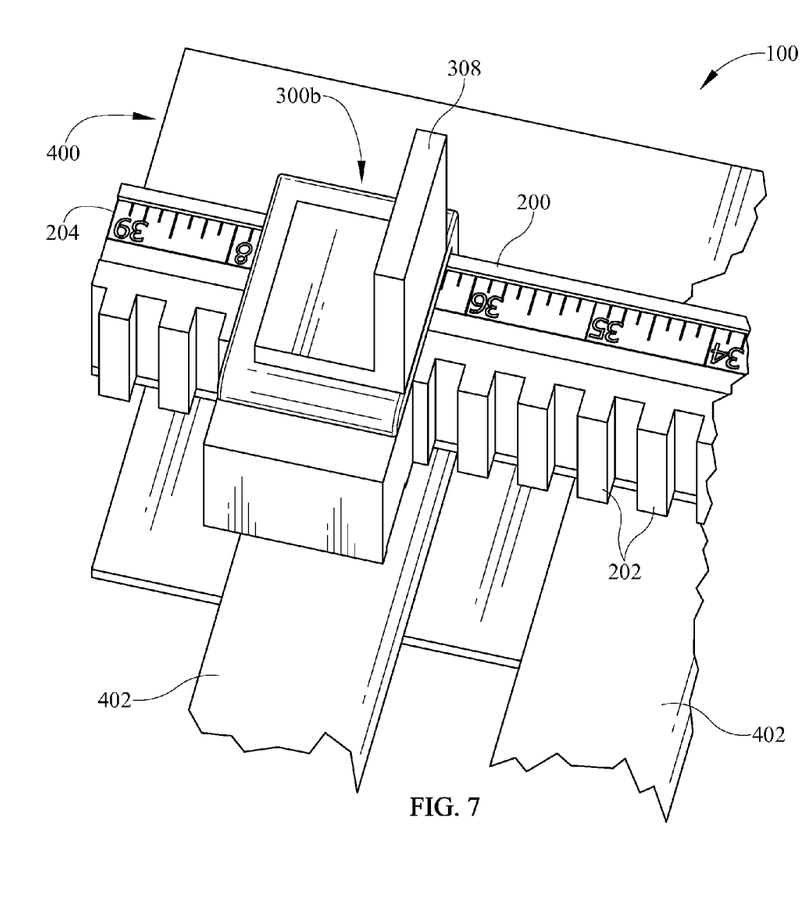
FIG. 7 is a detail view of a stop assembly and associated rule.

Referring now to FIGS. 4 and 5, a stop assembly 300 may be provided with a stop body 301 having rear surface 310, a side surface 312, and a top surface 314 extending therebetween. An array of stop teeth 302 that matingly engage the fence teeth 202 may extend laterally from the rear surface 310 of the stop body 301. Like the fence teeth 202, the stop teeth 302 are generally shown in the Figures as being square and having three vertical walls 303, but may be provided in any number of shapes or sizes. The stop teeth 302 may be, for example, square, rectangular, triangular, trapezoidal, or sinusoidal in shape. The stop teeth 302 may also have, for example, square or rounded edges and corners. The possibilities are limitless, it being understood that basically any meshingly engaging or male/female structure is possible. For example as shown in FIG. 10, a fence and stop assembly is shown having dovetail type teeth, also with three vertical walls.

Because the fence teeth 202 and stop teeth 303 meshingly engage, a stop body 301 may be manufactured simply by cutting a length of material off of a fence 200 during the manufacturing process of the fence 200.

As shown in FIGS. 6-9, a stop 300 may also be provided with a handle 308 to facilitate removing the stop 300 off of the fence 200 and placing it in a new location along the fence 200.

The number of teeth in the array of stop teeth 302 is typically fewer than that of the array of fence teeth 202, but this feature is not necessary. The spacing of the fence teeth 202 and stop teeth 302 may be such that a user may easily adjust the cut length in uniform increments, such as, for example, ¼ or ⅛ inches. For example, a fence and stop assembly may have ⅛ inch wide teeth spaced at a distance of ⅛ inches, allowing for adjustments in increments of ¼ inches.

In other embodiments, shims may be affixed to a side surface 312 of a stop assembly either by a clip, or preferably, by welding or fastening a shim of a known thickness to side surfaces 312 of several separate stop assemblies 300. Such an arrangement provides several stop assemblies 300 with a single fence. Therefore, a single fence with ¼ inch wide teeth with ¼ inch spacing between teeth may still be used to cut in increments of ¼, ⅛, 1/16, or 1/32 of an inch. The increments are limitless.

The stop assembly may also be provided with a clip 304 that extends to the rear of the fence 200. The clip 304 may generally have a lateral arm 305 and a vertical arm 306. The two arms 305, 306 may be integrally formed as one piece or may be affixed together using known methods. The lateral arm 305 is affixed to the top surface 314 of the stop body 301 by any known means or may be formed from the same piece of material used to form the stop body 301. The lateral arm generally extends laterally over the top surface 214 of the fence body 201. The vertical arm 306 then extends downwardly to abut against the rear surface 212 of the fence body 201.

The mating engagement between the fence teeth 202 and stop teeth 302 and the utilization of the clip 304 at the rear of the fence secure the stop assembly 300 to the fence 200, thereby preventing lateral movement between the fence 200 and stop assembly 300. The meshing engagement between the teeth 202, 302 limit lateral movement between the fence 200 and stop 300 along a longitudinal axis of the fence 200. The relationship between the fence 200, stop 300, and clip 304 limit lateral movement between the fence 200 and stop 300 in a direction substantially orthogonal to a longitudinal axis of the fence 200. Other means may also be utilized to restrain movement in this orthogonal direction, such as by magnetizing one or both of the fence 200 or stop 300. Any other mechanical means of limiting motion are also contemplated. For example, the dovetail type tooth structure shown in FIG. 10 completely eliminates the need for a clip 304.

The piece of material 50 that is to be cut is abutted against both the fence 200 and the stop assembly 300 and is secured from moving in two directions of lateral movement. This allows a saw to then cut the material 50 to length.

As shown in FIGS. 6-9, a saw stop assembly 100 may be provided as a system such that it is simultaneously provided with multiple stop assemblies 300a, 300b. A first stop assembly 300a may be closer to the saw than a second stop assembly 300b. The first stop assembly 300a may extend a first distance from the fence. The second stop assembly may be farther from the saw than the first stop assembly. The second stop assembly may extend from the fence 200 a second distance, whereby the second distance is longer than the first distance.

Figure 8:
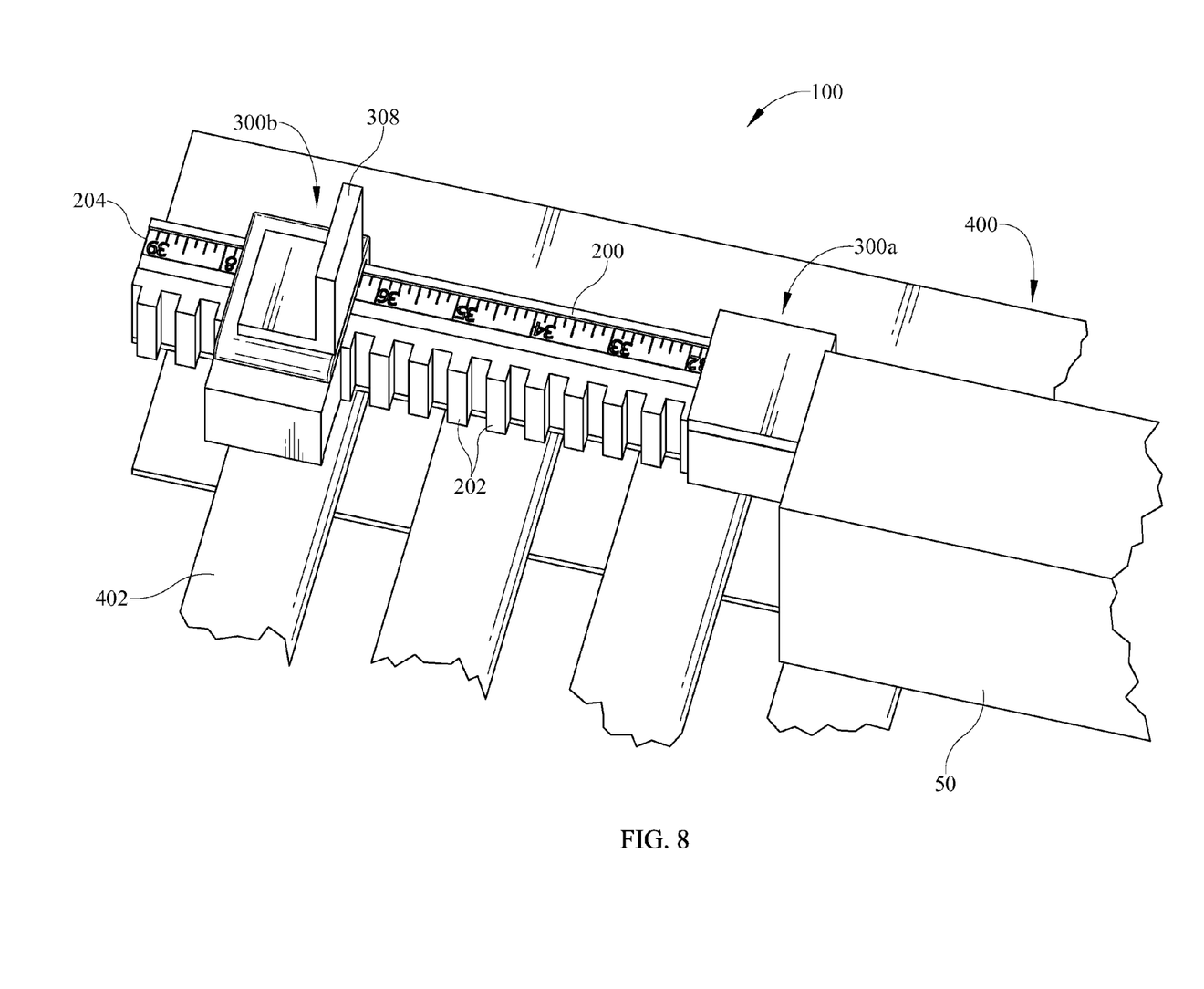
FIG. 8 illustrates a timber biased against a large stop assembly, while bypassing a small stop assembly
Figure 9:
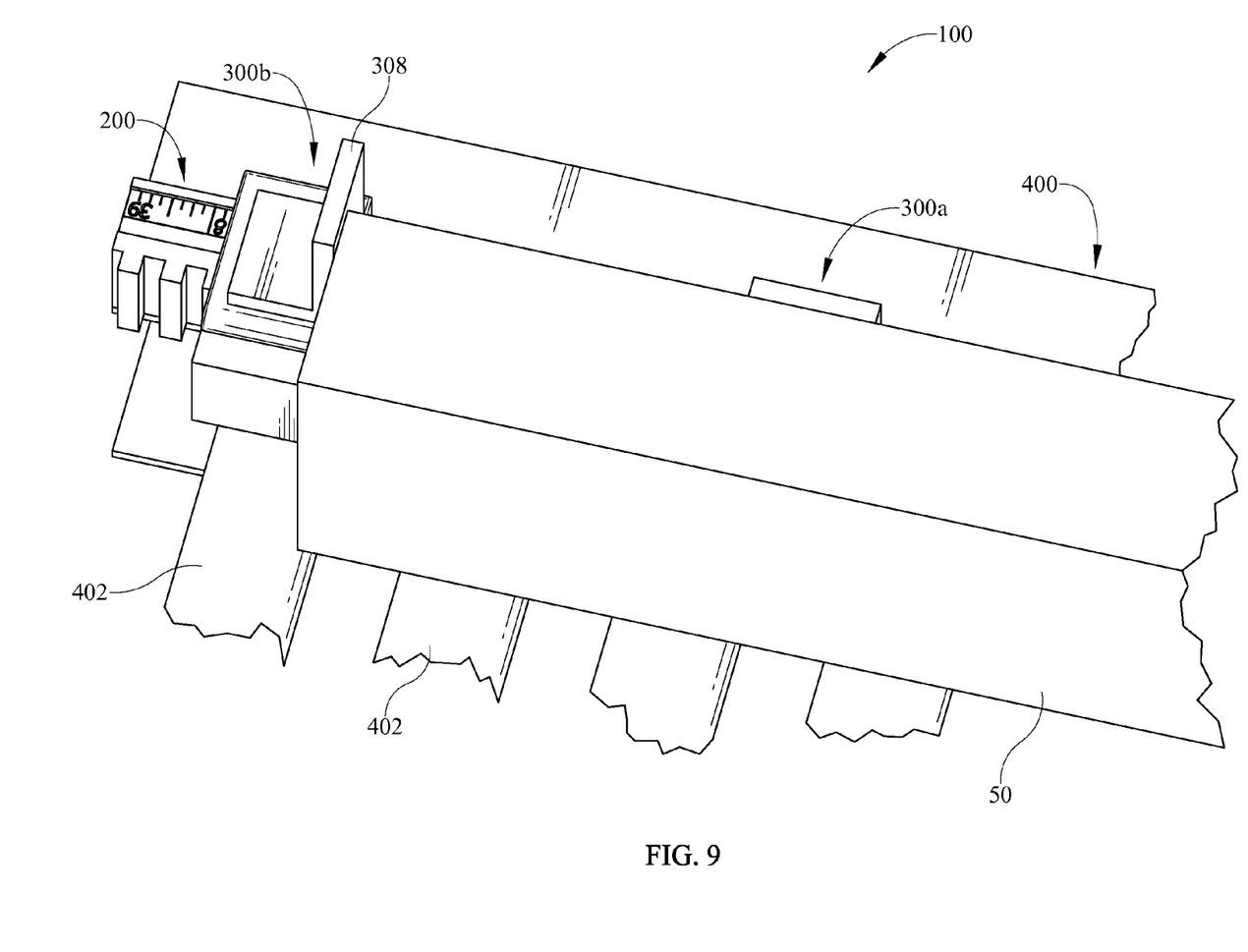
FIG. 9 illustrates a timber biased against a small stop assembly.

As shown in FIGS. 8 and 9, this configuration allows for a piece of material 50, such as a timber 50, to be cut to one length using the second stop assembly 300b, and cut to a second length using the first stop assembly 300a. This allows an operator to cut material 50 to multiple lengths with little to no changes in the fence assembly.

The foregoing description of structures and methods has been presented for purposes of illustration. It is not intended to be exhaustive or to limit the invention to the precise steps and/or forms disclosed, and obviously many modifications and variations are possible in light of the above teaching. It is understood that while certain forms of a saw stop have been illustrated and described, it is not limited thereto and instead will only be limited by the claims, appended hereto.

The invention claimed is:

1. A saw stop assembly comprising:
   an elongated fence disposed in a first lengthwise direction comprising a plurality of first dovetail teeth disposed in repeating fashion along said first lengthwise direction, each of said first dovetail teeth further comprising at least three engagement surfaces wherein each engagement surface is disposed at an acute angle with respect to a neighboring said engagement surface in a second direction orthogonal to said first lengthwise direction;
   a first stop comprising one or more second dovetail teeth, each of said second dovetail teeth further comprising at least three stop engagement surfaces wherein each stop engagement surface is disposed at an acute angle with respect to a neighboring said stop engagement surface and which are geometrically similar to said first dovetail teeth;
   wherein each tooth of said one or more said second dovetail teeth matingly engageable with a respective one of said first dovetail teeth in only one translational direction, wherein said translational direction is both orthogonal to said first lengthwise direction and collinear with the planar surfaces of said engagement surfaces; and
   a second stop comprising one or more third dovetail teeth, wherein said first stop has a first dimension extending from said fence and said second stop has a second dimension extending from said fence, and wherein said first and second dimensions are unequal.

2. The saw stop assembly of claim 1, further comprising a clip affixed to said first stop.

3. The saw stop assembly of claim 1, wherein said plurality of first dovetail teeth is greater than said one or more second dovetail teeth.

4. The saw stop assembly of claim 1, wherein said fence is removably coupled to a saw table.

5. The saw stop assembly of claim 1, wherein said fence includes incremental markings thereon.

6. A saw stop assembly comprising:
   an elongated fence disposed in a first lengthwise direction and further comprising a first array of dovetail teeth; and
   a first stop comprising a second array of dovetail teeth;
   wherein each tooth of said first array of dovetail teeth comprises at least three vertical engagement surfaces wherein each engagement surface is disposed at an acute angle with respect to a neighboring said engagement surface in a second direction orthogonal to said first lengthwise direction;
   wherein said second array comprises fewer teeth than said first array;
   wherein each of said second array of dovetail teeth matingly engages with a respective one of said first array of dovetail teeth in only one translational direction, wherein said translational direction is both orthogonal to said first lengthwise direction and collinear with the planar surfaces of said engagement surfaces; and
   wherein said fence includes incremental markings thereon.

7. The saw stop assembly of claim 6, further comprising a clip.

8. The saw stop assembly of claim 6, further comprising a second stop comprising a third array of dovetail teeth.

9. The saw stop assembly of claim 8, wherein said first stop has a first dimension extending from said fence and said second stop has a second dimension extending from said fence, and wherein said first and second dimensions are unequal.

10. The saw stop assembly of claim 6, wherein said fence is removably coupled to a saw table.

11. A saw stop assembly comprising:
- a fence having a fence rear surface, a fence front surface, and a fence top surface extending between said rear and front surfaces, said fence extending in a lengthwise direction;
- a first stop comprising a stop rear surface, a stop side surface extending substantially orthogonally from said stop rear surface, and a stop top surface extending between said stop rear surface and said stop side surface;
- a plurality of fence dovetail teeth extending laterally from said fence front surface in a direction orthogonal to said lengthwise direction;
- one or more stop dovetail teeth geometrically similar to said fence dovetail teeth and extending laterally from said stop rear surface; and
- a clip comprising a lateral arm and a vertical arm, said lateral arm being affixed to said stop top surface;
- wherein, when assembled, said one or more stop dovetail teeth meshingly engage some of said plurality of fence dovetail teeth only in one translational direction which is orthogonal to said lengthwise direction and orthogonal to said fence top surface and said clip lateral arm extends over said fence top surface, and said clip vertical arm is in contact with said fence rear surface.

12. The saw stop assembly of claim 11, wherein said plurality of fence dovetail teeth is greater than said one or more stop dovetail teeth.

13. The saw stop assembly of claim 11, further comprising a second stop.

14. The saw stop assembly of claim 13, wherein said first stop has a first dimension extending from said fence and said second stop has a second dimension extending from said fence, and wherein said first and second dimensions are unequal.

15. The saw stop assembly of claim 11, wherein said fence is removably coupled to a saw table.

16. The saw stop assembly of claim 11, wherein said fence includes incremental markings thereon.

* * * * *